UNITED STATES PATENT OFFICE.

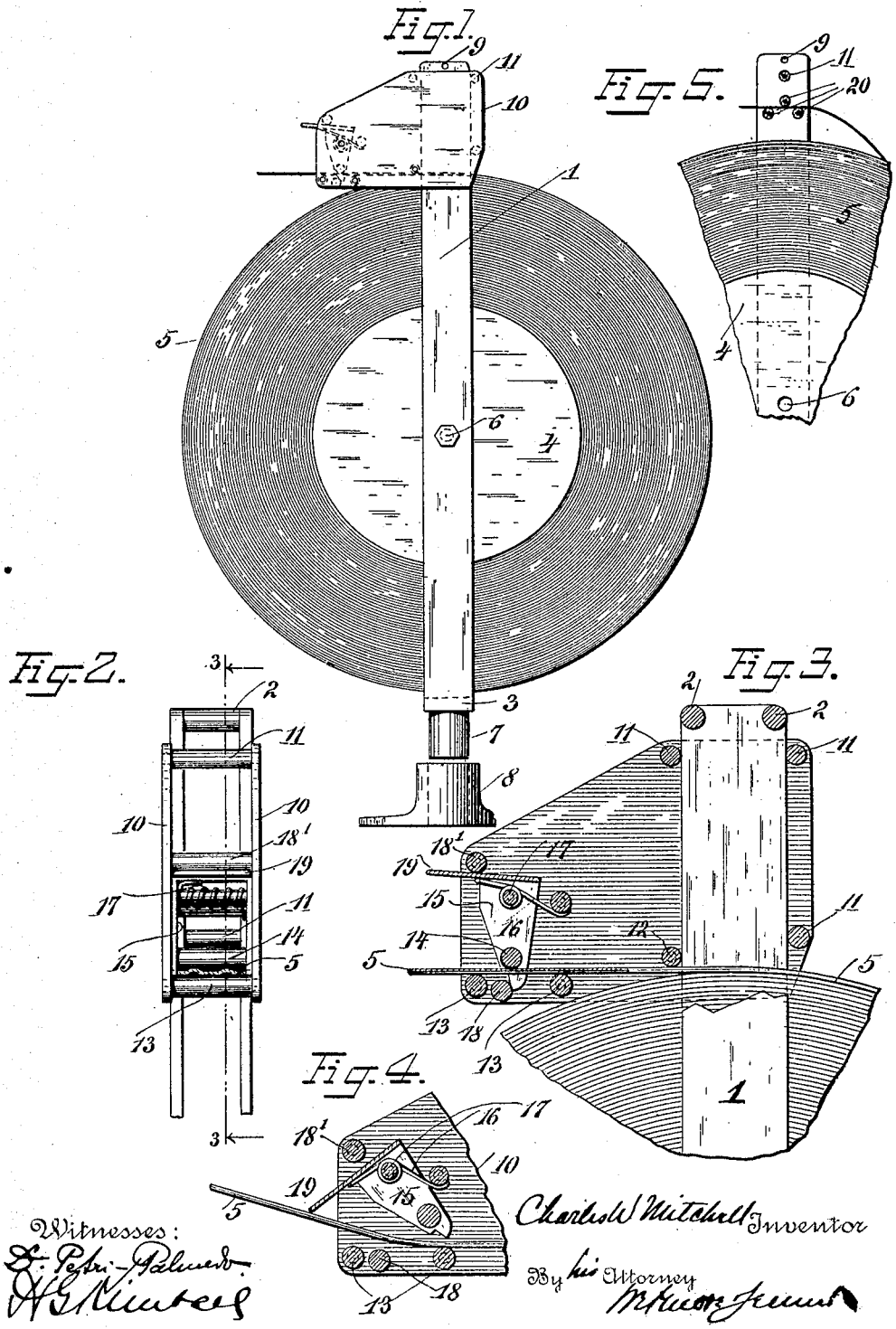

CHARLES W. MITCHELL, OF BROOKLYN, NEW YORK.

BOX-STRAP-SUPPLY REEL.

No. 919,371.      Specification of Letters Patent.      Patented April 27, 1909.

Application filed December 26, 1907. Serial No. 408,218.

*To all whom it may concern:*

Be it known that I, CHARLES W. MITCHELL, a citizen of the United States, residing at Brooklyn, New York, have invented certain new and useful Improvements in Box-Strap-Supply Reels, of which the following is a full, true, and concise specification.

My invention relates to supply-reels for flat box-straps and is especially useful in connection with longitudinally corrugated box-straps which are difficult to handle or dispense when supplied on spools or in coils, on account of the stiffness due to its curved cross-section, and the object of my invention is to provide a reel for such and similar kinds of box-straps which will act upon the strap, as it is drawn from the spool or coil, to straighten it or take out the curvature given to it by the spool, thus facilitating the application of the strap to the box, and providing a container for the supply of strap, from which appropriate lengths may be drawn, as needed.

The invention also involves other features of advantage and importance as will hereinafter be made to appear and be particularly pointed out in the claims.

Referring to the drawings forming a part hereof, Figure 1 illustrates in side elevation one form of my invention with a full spool in place within the reel; Fig. 2 an enlarged front elevation of the delivery device of the reel; Fig. 3 a section on line 3—3 of Fig. 2; Fig. 4 is a detail of the tension device in opened position; and Fig. 5 is a modified and simplified form.

The reel comprises a frame or yoke formed of two flat side-members 1 suitably spaced apart and united by a number of cross-pins 2 and by a base-portion 3, the space between the bars being sufficient to receive the spool or core 4 upon which the box-strap, shown at 5, is coiled. At a central portion the two side-bars 1 are perforated in registry, and a removable bolt 6, in the perforation, serves as the pivotal support for the spool, which is also adapted, as by tightening the nut thereon, to flex the flat side-bars toward each other so as to cause them to bear more or less frictionally upon the sides of the spool or the edges of the coiled strap, and prevent too free a turning of the spool on its pivot. The base portion 3 of the yoke is provided with a swivel plug 7 adapted to fit in the socket of a corresponding standard 8, as indicated in Fig. 1, by which means the reel may be held in an upright position with freedom to turn in different directions, according to the convenience of the user. If desired, however, the frame may be hung by a chain or cord, or other support, for which purpose a hole is provided at one or both ends of the yoke as shown at 9.

The yoke supports a delivery device at one end, which retains the box-strap against reflexing or unwinding from the spool and straightens or prepares it for convenient handling as it is drawn out for use. This device comprises in Figs. 1–4 two side-plates 10 joined by cross-pins 11 by which it is confined to slide freely on the yoke, so as to rest by gravity upon the top of the coil of box-strap, where its roller or cross-member 12 will directly engage the top layer of the coil. Between the side-plates I arrange two or more fixed lower rollers 13, 13, and an upper roller 14, forming a pass between them through which the box strap is drawn. The upper roller in this form, is carried by a movable support or yoke 15 combined with a spring 16 which presses the roller 14 toward the lower rolls, and the yoke 15 is preferably pivoted to a cross-pin 17 somewhat in the rear of the roller 14, so that the travel of the box-strap through the pass will tend to maintain the upper roller in this position, but the inward movement of the roller 14 is limited by the fixed stop 18 engaged by the extremity of the pivoted yoke, as well as by the handle 19 of said yoke which engages another cross-pin 18'. The pass between the rollers is so arranged that as the box-strap is drawn through them in the manner indicated it is straightened out in obvious manner, and as the coil decreases in size the sliding delivery device follows it, so that the strap always enters the rolls from the same direction. In replenishing the reel with a fresh spool of box-strap the pass is opened by pressing with the finger upon the handle 19 of the pivoted yoke so as to lift the roller 14 away from the lower rollers as shown in Fig. 4 and inserting the end of the box-strap between them. After the handle 19 is released, the roller assumes its normal position, shown by Fig. 3. By reason of the spring pressure exerted upon the strap, the yoke 15 serves as a tension device which holds the strap from springing back out of the rollers when the delivered portion has been severed and the remaining end flies back.

In Fig. 5 I have shown my invention embodied in a supply-reel of less parts and wherein the delivery device consists of a set of three straightening rollers 20 mounted in relatively fixed positions and directly upon the main yoke. In this case the box-strap is drawn through the straightening rollers 20, as it is unwound from the spool, and the curvature existing in it while on the spool is thereby removed, to prepare it for convenient handling. The friction of these rollers upon the strap is sufficient to retain the end of the same safely within the yoke and the device possesses similar advantages to the form first described.

Having described my invention, what I claim and desire to secure by Letters Patent is:

1. A box-strap supply-reel comprising a yoke and a pivotal support therein for the spool or coil of box-strap, in combination with a delivery device on said yoke comprising a set of rollers constituted to straighten the box strap drawn through them and retain the severed end therein.

2. In a box-strap supply-reel, a spool-supporting yoke, and a delivery device on said yoke comprising oppositely disposed rollers providing a pass for the box strap between them, and a spring-pressed support for one of said rollers.

3. In a box-strap supply-reel, a yoke adapted to embrace the spool of box-strap, and a sliding delivery device on said yoke adapted to rest upon and follow the coil on said spool and provided with means for straightening the box-strap drawn therethrough.

4. In a box-strap supply-reel, a yoke formed of flexible side members and means for pressing the same upon the contained spool of box-strap, in combination with a set of delivery rollers carried by said yoke and serving to retain the severed end of the box-strap.

5. In a box-strap supply reel, a yoke comprising side members adapted to embrace the spool of box-strap, a vertical swivel support for said yoke, and a delivery device comprising a set of transverse strap-straightening members operating to straighten the box-strap drawn through them and adapted to retain the severed end thereof.

In testimony whereof, I have signed my name to the specification in the presence of two subscribing witnesses.

CHARLES W. MITCHELL.

Witnesses:
H. G. KIMBALL,
A. A. LORZER.